John J. Clancy
David W. Lovering
Robert C. Wells
*INVENTORS*

3,108,009
PROCESS COATING A SUBSTRATE WITH AN OPAQUE COATING AND RESULTANT ARTICLE
John J. Clancy, Westwood, David W. Lovering, Needham, and Robert C. Wells, Arlington, Mass., assignors to Arthur D. Little, Inc., Cambridge, Mass., a corporation of Massachusetts
Filed Oct. 4, 1960, Ser. No. 60,358
20 Claims. (Cl. 117—46)

This invention relates to a novel coating, to substrates coated with it, and to a process for forming the coating. More particularly, this invention relates to a novel, opaque coating which is essentially water-insensitive and which may have modified surface characteristics.

In a co-pending application Serial No. 612,520, filed on September 27, 1956, in our names, and now abandoned, there is disclosed a novel method of coating a substrate, such as a boxboard, to form an essentially nonpigmented, opaque surface film permanently adhered to the substrate. The resulting coating is characterized as being intensely bright, nonflaking and controllably pressure-sensitive. The invention described herein is a continuation-in-part of the invention in Serial No. 612,520.

Many surfaces require a coating either for protection or as background surface for printing, stamping, marking and the like or as an ink in printing. Normally, such coatings or inks contain pigments to effect the necessary light scattering, such as the titanium dioxide used in a white paint; and when these pigments are used in sufficient quantities in a coating to provide effective covering or hiding power, and to make a smooth, uniform bright surface with good printing qualities, the weight of the coating must be appreciable. This, in turn, has at least two drawbacks, i.e., it adds materially to the weight of the final supporting material and it results in a finish which, under some conditions, is readily cracked off in the normal processes of handling, bending and scoring if the background material is flexible. Thus, it would be very desirable to have available a type of coating which when applied in a novel manner does not require high coating weights and which does not chip off.

Nonpigmented, opaque coatings have been made to form so-called "blush coatings" on recording paper on which tracings could be made by a stylus by application of heat and/or slight pressure of the stylus. Such a blush coating is disclosed in U.S. Patent 2,739,909 in which a heat-sensitive, pressure-sensitive coating formed of a thermoplastic material is deposited on a flexible backing for recording the tracing made by a stylus. When the stylus tracing is to be made by application of heat through the stylus point, the thermoplastic material which has been deposited so as to form a multiplicity of microscopic or submicroscopic voids fuses to collapse and coalesce the voids, thus making the tracing marks visible. Likewise, the application of a slight pressure from the stylus collapses the microscopic voids of the blush coating to form an impression. Although these blush coatings create somewhat of an opaque covering without the use of pigments, they are not usable for coating surfaces which must be heat-insensitive and which must also be pressure-insensitive or sensitive to pressures of a predetermined and controllable degree.

There are many applications where it would be very desirable to have a coating which contains no pigment as such, and which is at the same time capable of covering a wide variety of surfaces. The coating of this invention is such a coating. As will be evident below, a particulate additive may be incorporated into the coating, not to contribute opacity, but to modify the physical characteristics of at least the coating surface.

The coating of this invention may have a wide variety of uses, among which may be listed application to so-called boxboard to eliminate the now commonly used paper liners or clay coatings; wall paint; printing ink (particularly white ink used on a dark background); a one-use, positive-printing duplicating paper; and printing plates for a number of different types of printing such as intaglio and letterpress.

It is, therefore, a primary object of this invention to provide an opaque coating composition which does not require the use of pigments to achieve a high degree of light scattering and which produces a white or colored surface. Among other objects of this invention may be listed the following:

To provide a coating composition which requires only one application of coating to produce a uniform finish with good brightness;

To provide a nonpigmented coating composition which is heat-insensitive and water-insensitive;

To provide a nonpigmented coating composition which may be so varied as to make it pressure-sensitive or pressure-insensitive over a wide range of pressures;

To provide a nonpigmented coating, suitable for covering all types of surfaces (including cellulosic materials, synthetics, plaster, and metal) which is resistant to heat, water and a predetermined degree of pressure;

To provide a coating which can be applied to surfaces which are generally bent, folded, scored, and marked without chipping, cracking or otherwise adversely affecting the continuity of the coating or its brightness characteristics;

To provide a coating of the character described which has good printability, extremely high gloss and the like;

To provide a coating which can be used to replace the usual bleached paper liners and/or heavy clay coatings used in the construction of boxboard thus reducing the weight of the boxboard and minimizing the expense of boxboard manufacture by elimination of the bleached liners and by the use of cheaper body stocks;

To provide a coating for paper or boxboard which takes advantage of the low density of the coating to contribute bulk for good printing smoothness without adding an appreciable weight of coating, as in the case of the usual heavy clay coatings, to obtain an equivalent surface;

To provide a nonpigmented paint for application to rigid structures, such as walls, which may be white or suitably colored;

To provide a novel type, positive-printing duplicating material capable of being marked by application of pressure from such as type face or a hand-held instrument;

To provide a white ink, suitable for intaglio printing on dark backgrounds, which contains essentially no pigments and which will not crack or flake off; and To provide a new type printing plate suitable for application in a variety of printing methods.

These and other objects will be apparent in the following discussion.

The coating of this invention comprises a film-forming binder-matrix material, which, together with suitable other constituents, is applied to the surface to be coated in such a manner as to produce throughout the final dry coating a multiplicity of air-matrix interfaces, thus causing incident light to be scattered by the coating to give a surface of high relative brightness. These air-matrix interfaces, in turn, are formed by applying the coating in such a manner that when it is in final dry form the matrix which is a continuous film is throughout minutely porous or cavernulous, and appears to be smooth and homogeneous to the naked eye, but which under a powerful microscope is seen to include a multiplicity of air-matrix interfaces, the longest dimension of which is preferably not over five microns.

The coating is applied as an emulsion, the film-forming matrix material in water solution being the continuous phase and a water-immiscible liquid being the discontinuous phase.

The multitudinous, minute, air-matrix interfaces which provide the uniformly cavernulous structure of the final coating of this invention are formed after coating application by first expelling or driving off a portion of the liquid of the continuous phase to leave a continuous film of binder which contains minute pockets of the liquid of the discontinuous phase, and subsequently driving off this latter liquid from the minute pockets to form a structure containing the air-binder interfaces. This mechanism requires that the two liquids forming the two phases are immiscible and that the liquid for the continuous phase is a solvent for the binder (in which the term solvent may refer to the continuous phase in a colloidal solution) while that for the discontinuous phase is essentially a nonsolvent for the binder.

In order to render the final coating water-insensitive, a modifying agent is added to either react with the binder to form an insoluble salt of the binder or to cause certain cross-linking of the binder molecules to impart water-insensitivity. The final water-insensitive binder is in the nature of a thermosetting material, thus contributing to the coating composition's insensitivity to heat. Moreover, modifying the coating composition to make it water-insensitive also, at the same time, makes the final coating more resistant to pressure. Pressure resistance may be further controlled by varying the component ratios.

The composition used to achieve the coating of this invention may then be described as a two-phase liquid composition comprising an aqueous solution of a binder, as the continuous phase; a liquid having a boiling point above that of water at the drying temperature, as the discontinuous phase; and modifying agents which act to render the binder water-insoluble or water-insensitive when the liquid phases of the coating composition have been removed to dry the binder. In addition a particulate additive capable of modifying the characteristics of the film (e.g., printability) may be added. It may also be desirable to include a solubilizing agent to aid in putting the binder into an aqueous solution and to add a dispersing agent to disperse the discontinuous phase liquid in the aqueous binder solution.

It is important to note that the final opaque coating of this invention is to be distinguished from coatings which contain discrete and normally unbroken bubbles or small flaked particles; from blushed coatings, such as are heat and pressure sensitive; and also from an ordinary sizing composition which in itself scatters very little light.

This invention will be more fully described below with reference to the accompanying drawings in which.

Figure 1:
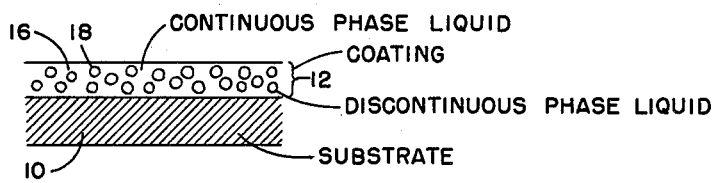
FIG. 1 is a greatly enlarged cross-section of a substrate with the coating of this invention after it has been applied but before any appreciable amount of either liquid has been expelled.
Figure 2:
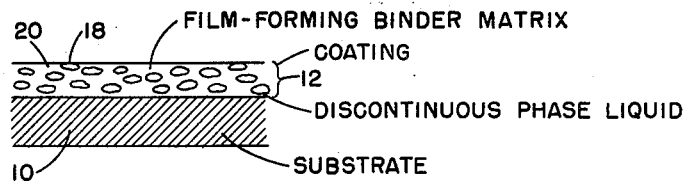
FIG. 2 is the same coated substrate after the binder solvent or liquid of the continuous phase is driven off but before the final drying is accomplished.
Figure 3:
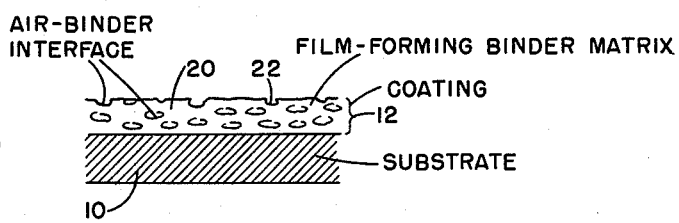
FIG. 3 is the same coated substrate material after drying is completed.

The mechanism of the formation of the air-binder interfaces may be explained, in a much simplified manner, with reference to FIGS. 1, 2 and 3 in which like numbers refer to like elements. In these figures, substrate 10, such as paperboard, a wall or the like, is coated with a layer of the coating composition 12 formulated in accordance with this invention. In FIG. 1 coating composition 12 is made up of the continuous phase 16 (a casein solution for example) and minute globules or pockets 18 of the liquid of the discontinuous phase dispersed in the continuous phase 16. In FIG. 2 wherein a portion of the binder solvent (which is the liquid of the continuous phase) has been driven off, the coating comprises the binder matrix 20 and minute pockets 18 of the liquid of the discontinuous phase. It is believed that after at least a portion of the liquid of the continuous phase has been driven off some shrinking of the coating takes place and the globules 18 probably assume an ellipsoid-like shape. With the expulsion of at least a portion of the continuous phase liquid, the film-forming binder matrix sets up to form a gel-like structure. Finally, when all of the liquid in the globules 18 of FIG. 2 is driven off there remains the air-binder interfaces 22 (FIG. 3) which serve to scatter incident light and produce the opaque coating of this invention. These interfaces 22 generally vary in maximum dimension from about one-tenth to one micron, depending upon the conditions under which the coating was formed. It is preferable that no appreciable number of air-binder interfaces have a maximum dimension of more than five microns.

Figure 4:
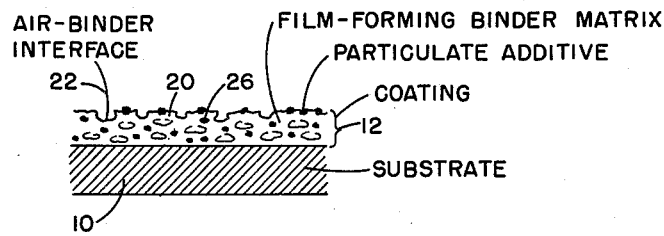
FIG. 4 illustrates the addition of a particulate additive to the coating of this invention as a means for modifying its physical characteristics.

FIG. 4 illustrates in like diagrammatic manner a coating which is modified to the extent that the binder-matrix material contains permanently bonded therein a finely divided particulate additive.

As defined above, the coating of this invention must be water-insensitive or water-insoluble. Water-insensitivity may be defined as being capable of retaining its structure and remaining opaque for an appreciable period of time after water has been dropped on it. The binder-matrix material must therefore be a film-forming material which is water-insoluble or which can be rendered essentially water-insoluble in the process of forming the coating. Suitable binder materials may be selected from the group consisting of casein, alpha protein, water-dispersible elastomers (natural and synthetic rubbers) and mixtures thereof.

In the case of the elastomeric materials it is desirable to use an appreciable percentage by weight of casein or alpha protein in the binder. This is due to the fact that the elastic binders have a tendency to stretch, when the liquid of the discontinuous phase is driven off, rather than break to form the required air-binder interfaces.

It is well known that casein or alpha protein, or mixtures of them, can be put into a water solution only with the aid of a solubilizing agent which is alkaline in nature. Such solubilizing agents include, but are not limited to, ammonium hydroxide, sodium hydroxide, sodium tetraborate (borax), sodium carbonate and trisodium phosphate. Any of the known solubilizing agents for casein can be used in the process of formulating the coating of this invention.

Inasmuch as a casein or other protein-containing coating in an unmodified state would be somewhat sensitive to water or to moderate pressure, it is necessary to add to the coating composition a modifying agent which will convert the casein to a water-insoluble condition in the final coating. This may be conveniently done by adding to the binder solution an inorganic metal salt which is appreciably soluble in the binder solvent and which forms an insoluble derivative with the binder. Thus, where casein is used as the binder, it has been found satisfactory to add zinc sulfate. The resulting coating then comprises the water-insoluble zinc salt of casein, making the final coating practically water-insoluble. Casein or alpha protein, or the binder mixtures containing one or a combination of these may also be modified by reacting with other metallic ions such as copper, aluminum and chromium to convert these binders to an essentially insoluble form.

The amount of modifying agent to be added is based upon the assumption that a reaction takes place between the modifier and casein (or alpha protein) as indicated below, using zinc sulfate and ammonium caseinate as examples of the reactants.

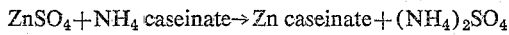

In this example ammonia was used to solubilize the casein.

So-called blocked isocyanates may be added to harden the casein or alpha protein. These blocked isocyanates are commercially available and may generally be defined as phenol-blocked diisocyanates.

Finally, the binder may be modified in another way to render the final coating water-insensitive. This alternative technique is based on the addition of an aldehyde to the coating formulation to react with the protein present through the amino group to form an insoluble cross-linked product. The reaction with an aldehyde may take place before the casein or alpha protein-bearing coating is applied by adding the aldehyde to the liquid or after application to the area to be covered by exposing the applied coating to aldehyde vapors, for example, formaldehyde.

The liquid forming the discontinuous phase must have a boiling point above that of water at the drying temperature, but for practical purposes, this boiling point should not exceed about 350° F. Moreover, at the initial drying temperature, the discontinuous phase liquid must have a vapor pressure below that of water. Such liquids include, but are not limited to, xylene, kerosene, mineral spirits, high-flash naphthas, ketones such as butyl methyl ketone and amyl ethyl ketone, paraffin hydrocarbons such as octane, and the higher-boiling acetates such as butyl acetate or amyl acetate.

The final choice of the liquid of the discontinuous phase may also require the consideration of such factors as that which will give the brightest coating for a given weight per unit area of surface for a specific film-forming material; that which will prove to be the most compatible with other components such as the binder, the dispersing agent and any particulate additive, dye or dyes added; and that which will meet certain other requirements such as toxicity, inflammability, adaptability to production procedures, cost and the like.

Inasmuch as the mixing of the coating composition of this invention requires the thorough dispersing of one liquid in another, each of which is immiscible in the other, it is desirable to add a dispersing agent such as those commonly used to prepare emulsions. Such dispersing agent may be one of the appropriate soaps as ammonium, sodium, or calcium oleate or stearate, or other suitable emulsifying agents.

The dispersing agent may be formed in situ by a reaction between a weak organic acid and an alkaline metal ion furnished, for example, from an excess of solubilizing agent. Thus, if stearic acid is added to a coating mixture containing an excess of ammonium ions, ammonium stearate is formed and serves as the dispersing agent.

Generally, the ratio of binder-matrix material to the liquid of the discontinuous phase will range from about 1:1 to about 1:15. The actual ratio will depend upon the characteristic of the final coating desired. As a rule, the smaller the amount of matrix material, the higher the brightness of the final coating will be and the more sensitive the coating will be to pressure.

In preparing the binder solution it has been found desirable to formulate solutions having from about 5% to about 20% solids content by weight, while the amount of dispersing agent will generally vary from about 2 to about 5 parts by weight to 100 parts by weight of the liquid of the discontinuous phase.

The essentially nonpigmented coating of this invention may be made in any desired color by adding one or more dyes to the coating composition. The dyes may be either of the oil-soluble or water-soluble type added to the appropriate phase of the coating composition, depending upon the effects desired.

Although the opaque coating formed in accordance with this invention is intensely bright, highly opaque even in very thin films, and has many advantages over previously known coatings (including the ability to be scored and bent without flaking) it has been found that under some circumstances the surface of the coating is not as receptive to some types of printing ink as might be desirable. Thus, it has been found under some circumstances that the liquid medium of the ink does not wet the coating surface sufficient to permit rapid, high quality printing. It has been found that it is possible to modify the coating by incorporating in it a particulate additive or by subjecting it to surface treatment to enhance printability. Such modifications may also be used to obtain other desired results. Inasmuch as the surface treatments are part of the coating process they will be discussed below.

The particulate additives suitable for incorporation in the coating of this invention may be defined as finely divided particulate matter generally of inorganic origin which are inert to the binder material and to the discontinuous phase liquid under the conditions under which the film coating is applied to the substrate. The particulate matter is preferably sized finer than 12 microns, however, particle sizes up to those which can be substantially permanently bonded by the film-forming binder-matrix material may be used. The final surface characteristics of the modified film coating will control the size of the particulate matter; thus, if a coarse surface is undesirable then the particulate matter will be sized within the finer size range.

It is important to note that the particulate additives used in the coating of this invention are not present in the role of a pigment insofar as the term pigment is used generally to denote a material which contributes opacity to a system. On the contrary, it will be shown below that, although many of the particulate additives can in some coatings and sizings be considered pigments, they contribute no brightness or opacity to the coating of this invention.

The particulate additive may be further characterized as a material which is substantially wetted by either the water solution of the matrix material or by the discontinuous phase liquid, and which can be permanently bonded within the final matrix film. The particulate additive may also possess other more specific characteristics such as being highly absorbent to the liquid medium of the ink used in printing, or the capability of imparting modifications in the appearance of the surface, such as a metallic appearance which would be created by the use of finely divided aluminum powder or flakes as the particulate additive.

Typical particulate additives include, but are not limited to, chalk ($CaCO_3$), clay, titania, hydrated calcium silicate, metallic powders such as aluminum and bronze, carbon black and colored pigments such as ultramarine blue and the like.

The amount of particulate additive which may be as high as about eight times the weight of the binder-matrix material (solid basis) which is used. Generally, for making film coatings suitable for printing it will be preferable to use particulate additive to binder-matrix material ratios of from about 0.5:1 to 2:1.

In mixing the coating composition of this invention it is desirable to make up the binder solution (containing the insolubilizing agent) separately, and then while stirring very rapidly add the liquid which is to be discontinuous phase, in which the dispersing agent has been dissolved. If the dispersing agent is to be formed in situ, the acid reactant is added to the liquid used to form the discontinuous phase and the basic reactant to the binder solution.

If a particulate additive is to be incorporated into the coating composition, it may be introduced into the discontinuous phase liquid, but it is preferable to introduce it into the continuous phase, i.e., the binder matrix containing liquid. This preference is based on the fact that the continuous phase liquid is generally more viscous than the discontinuous phase liquid and thus is more suitable to effectively suspend the particulate additive. Moreover, better binding of the particulate additive is achieved by adding it to the continuous phase.

Once the coating has been thoroughly mixed, it may be applied to the substrate by any well-known technique, such as rolling, brushing, spraying, or printing. The substrate should be essentially dry, e.g., dry to the touch. It may, of course, contain the usual amount of moisture present, for example, in paper. Under some circumstances, it has been found desirable to heat the substrate (up to about 140° F.) while applying the coating.

After the coating has been applied to the substrate heat is applied to first drive off a portion of the water of the continuous phase liquid to cause the matrix material to set up in the form of a continuous gel-like film. Subsequently additional heat is applied to remove the remaining water and the discontinuous phase liquid. In the begining of the drying it is necessary that there exist a differential in the rates at which the water and the discontinuous liquid are removed to form the very small air-binder interfaces which distinguish the coating of this invention. This means that drying temperatures normally associated with papermaking such as those attained on drum driers, Yankee driers and the like are not generally suitable in the process of this invention; but the controlling factor is the temperature reached by the coating and not that of the environment.

If the coating of this invention is used for an application where it is inconvenient to apply heat (such as in painting a wall) the solvent and volatile organic liquid can be permitted to volatilize over a period of time, in much the same fashion as oil paint requires time for the oil carrier to oxidize or polymerize. This operation can be accelerated by providing good ventilation and by using more volatile solvents as the discontinuous phase liquid. In drying without additionally applying heat, the required initial differential in the rates at which the water and discontinuous phase liquid is achieved by virtue of the latter's having a higher boiling point and a lower vapor pressure than water.

The following examples are given to illustrate this invention, but they are not meant to be limiting.

Example I

Two hundred ninety pounds of water was slowly added, with stirring, to one hundred pounds of dry casein, and the mixture was permitted to stand for about 20 minutes until the casein particles were wetted and swollen by the water. An additional 200 pounds of water was added and the mixture was heated to about 160° F. To this heated mixture was added 20 pounds of ammonium hydroxide (28% $NH_4OH$) while the batch was stirred continuously until the casein was completely peptized. Care was exercised not to overheat the casein solution and as as soon as all of the casein had been peptized the solution was allowed to cool.

In a separate mixing vessel 10 pounds of zinc sulfate was dissolved in 40 pounds of water and the resulting solution was added slowly with constant stirring to the cooled casein solution. In another mixing vessel 24 pounds of stearic acid was added to 600 pounds of xylene and the mixture was stirred until the stearic acid went into solution.

The casein solution (containing the zinc sulfate) was then stirred very rapidly so that a strong vortex was formed around the shaft of the stirrer. The xylene, with the stearic acid in solution, was slowly added to this vortex and rapid stirring was continued until all the xylene had been mixed in. The excess ammonium hydroxide in the casein solution reacted with the stearic acid to form ammonium stearate in situ which served as the dispersing agent. The two liquids are preferably formed into the desired emulsion while maintained at a temperature between about 120 and 140° F.

The coating composition thus made was roller coated on essentially dry 16-point bending newsboard and the coating was dried in two steps, first to 150° F. to drive off most of the water and then to 220° F. to expel the xylene. The final coating was intensely white and can be defined as an opaque film essentially devoid of pigment and of occluded liquids, consisting essentially of casein having distributed throughout its entire volume multitudinous air-binder interfaces varying in maximum dimensions from about one-tenth to one micron with no appreciable number exceeding five microns thereby providing a uniformly cavernulous structure capable of scattering light to impart opaqueness to the film coating.

The coated newsboard sheets showed a brightness of approximately 70% as measured on a Hunter reflectometer or a General Electric brightness meter. The original newsboard had a brightness, before the coating was applied, of about 25%. The surface of the coated board was smooth to the touch, and glossy in appearance. The boxboard could be bent and folded sharply without showing any break in the coating. Even after successive bending and unbending of a scored line, the coating retained its smooth feel and glossy appearance. Under like treatment a coating containing pigment might have cracked off to show the dark colored newsboard.

The saving in weight when newsboard is coated with the coating composition of this invention rather than covered by liners affixed to its surface can be shown by the fact that one pound of the final dry coating of this invention is sufficient to cover 1000 square feet of newsboard while the added weight for a conventional coating for an equal area is approximately 5 to 15 pounds. Furthermore, the coating of this invention has economic advantages over conventional clay coatings.

The coating composition of this example may also be used to paint walls or as an ink to print on a variety of surfaces. It is particularly useful for intaglio printing of white ink on a colored or black background. The commonly used white inks, like the white paints, suffer from the presence of large amounts of pigments required to completely cover a dark surface and in addition require special printing techniques.

Example II

This example, along with Examples III–V, is given to illustrate the incorporation of a particulate additive into a casein coating such as produced in Example I.

To 300 grams of casein was added 600 grams of water and the resulting mixture was permitted to soak for 15 to 20 minutes to swell the casein. After the casein-water mixture had been permitted to soak, an additional quantity of 900 grams of water was added and the mixture was heated to 170° F. at which point 120 grams of ammonium hydroxide (28%) was added with stirring. The mixing was continued for five minutes until the ammonium hydroxide had served to completely solubilize the casein. The casein solution was then permitted to cool to 80° F. at which time a solution of 30 grams of zinc sulfate in 150 grams of water was added with continuous stirring. In this example a blocked isocyanate (sold as Mondur S by Mobay Chemical Co.) dissolved in a small amount of acetone was added to the casein solution as a hardening agent for the casein in the final film coating. This casein solution was then used as the continuous phase liquid in preparing the coating composition of this example and the remaining examples to follow.

To 1,120 grams of the casein solution was added 160 grams of calcium carbonate sized finer than about 0.25 micron as a particulate additive. An additional 800 grams of water was added and the dispersion heated to 120° F. In a separate vessel 27 grams of stearic acid was dissolved in 1,020 grams of xylene by heating to 140° F. The hot xylene solution was then added with rapid stirring to the casein solution containing the calcium carbonate and insolubilizing agent. The resulting coating composition which had a calcium carbonate to matrix material ratio of 1:1 was then ready to be applied to a substrate by any suitable technique such as rolling, painting or doctoring.

The coating composition was applied to 16-point bending newsboard by means of a coating roller and the film coating was dried in the prescribed manner by first heating to 150° F. to drive off most of the water and then at 220° F. to expel the xylene and form the desired air-matrix interfaces in the casein serving as the film-forming, air-matrix material. The finely divided calcium carbonate was evenly dispersed throughout the continuous film portion of the coating. The resultant coating had a brightness of about 75%, and a coating weight of 1.4 pounds per 1,000 square feet covered.

The coated boxboard printed uniformly on a Vandercook proof press with I.P.I. Tack-Graded inks. When the coating was made up without the calcium carbonate as a particulate additive it was not possible to print uniformly on the surface of the coating on the same press under identical conditions.

*Example III*

A coating composition was made up as in Example II except that 320 grams of clay, 92% of which was sized finer than 2.0 microns, was substituted for the 160 grams of calcium carbonate. Because the clay was somewhat more coarse (comparatively speaking) than the calcium carbonate, it was possible to use more of it than of the calcium carbonate.

*Example IV*

A coating was made up in accordance with Example I except that 80 grams of a hydrated calcium silicate was substituted for the 160 grams of calcium carbonate of Example II. This particulate additive was sized finer than about .030 micron and therefore it was preferable to use a smaller ratio of particulate additive to binder.

*Example V*

The calcium carbonate of Example II was replaced in a coating composition by 80 grams of aluminum flake which passed a standard 325-mesh sieve. Although the resulting film coating would not print particularly well because the aluminum flake would not absorb the ink medium, the surface had a highly lustrous metallic appearance which was quite pleasing.

Figure 6:
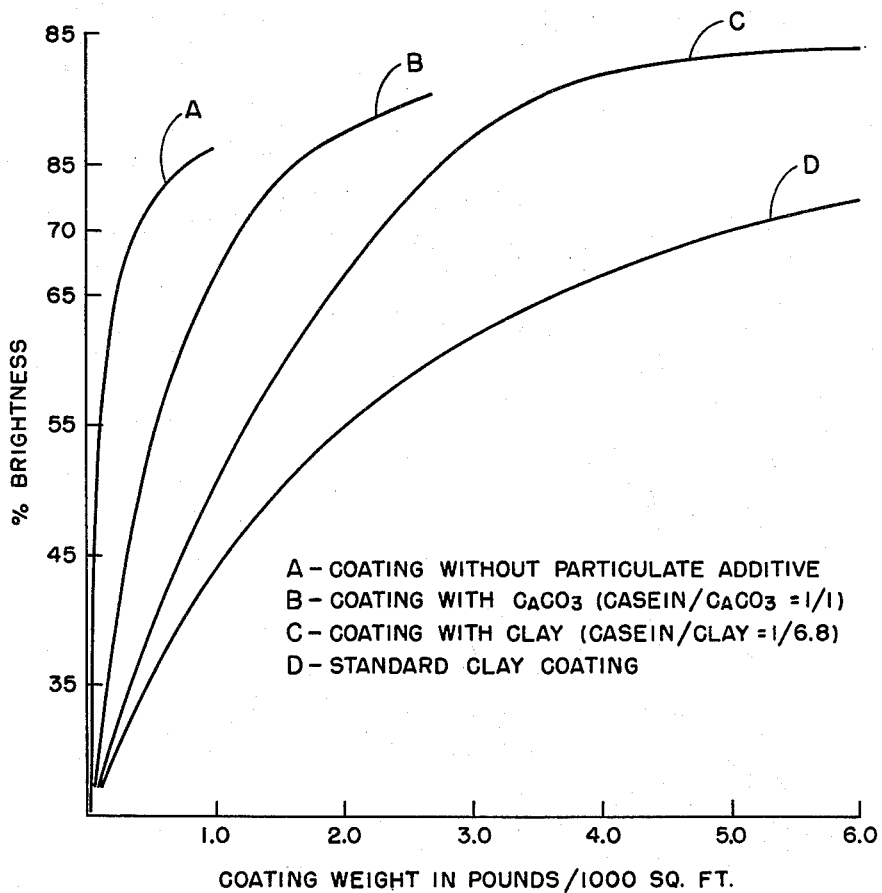
FIG. 6 is a plot of the percent brightness for varying coating weights of the coating of this invention; of the coating modified by the inclusion of a particulate additive; and of a standard, uncalendered clay coating.

In FIG. 6 the percent brightness, measured by a photometer, which was achieved by various coatings at varying coating weights, is plotted for comparative purposes. Curve A is the coating formed in Example I. This coating had no finely divided particulate matter as an additive. Curve B shows the variation in brightness with coating weight for the coating formed in Example II in which the ratio of binder-matrix material to particulate additive was 1:1; while curve C represents the coating prepared in Example III. Finally, curve D is plotted for a standard uncalendered clay coating formed by incorporating seven parts of clay to one part of alpha protein suspended in water.

Probably the best way of comparing the performance of these coatings is to assume a desired brightness and determine from FIG. 6 the coating weight in pounds per 1,000 square feet required to achieve this predetermined brightness level, in this case 70%. In the case of the coating without a particulate additive (curve A) this coating weight is 0.4 pound. Where calcium carbonate is added in the coating of curve B it is 1.2 pounds; while when a large amount of clay is added as in the coating represented by curve C, the coating weight is increased to 2.3 pounds. However, this is still appreciably less than one-half that of the 5.1 pounds required by a standard clay coating to achieve the predetermined brightness level.

It may therefore be seen that the incorporation of a particulate additive even in large amounts to the coating of this invention still permits comparatively small coating weights to obtain a good brightness level. As pointed out in the examples, coatings containing calcium carbonate or clay in a wide percentage range make possible satisfactory printing on the film surface. Moreover, these achieve an exceedingly small coating weight compared to a standard clay coating as shown in FIG. 6. It is also clear from FIG. 6 that the particulate additives are not acting as pigments for the coating without such additives is brighter and more opaque than any of those containing additives, even $CaCO_3$ which itself is very white.

The remaining examples are given to illustrate the use of other binder materials and discontinuous liquids along with the application of dyes.

*Example VI*

An equal amount of alpha protein powder was substituted for the casein of Example I and a coating composition made up in the same manner using all other components in the quantities given in that example. Dark body stocks were coated with the resulting coating composition which, when dried by the process described in Example I, had a brightness between 70 and 75%.

*Example VII*

Two binder solutions were made separately, the first containing 50 pounds casein, 5 pounds zinc sulfate, 10 pounds ammonium hydroxide (28% $NH_4OH$) and 290 pounds water mixed in the order indicated in Example I, and the second being the same as the first except that it contained 50 pounds of alpha protein in place of casein. These two separate binder solutions were then thoroughly mixed and into the mixed binder solution was added, with very rapid stirring, 600 pounds xylene containing 24 pounds stearic acid.

The ratio of casein to alpha protein in such a mixed binder composition may be varied over the complete range, i.e., 0–100% casein with 100–0% alpha protein. The final coating gave a very satisfactory brightness in excess of seventy percent when applied by brush to a plaster wall.

*Example VIII*

An equal quantity of kerosene was substituted for the xylene of Example I. Mixing procedures, applications and final coating results were essentially the same as in Example I.

Likewise, a water-immiscible, high boiling ketone (such as butyl methyl ketone), a hydrocarbon (such as octane) or a higher-boiling acetate (such as butyl acetate) may be similarly satisfactorily substituted for the xylene of Example I.

*Example IX*

To 10 pounds of the final casein solution of Example I was added 5 pounds of a water dispersion of a high-styrene low-butadiene copolymer and after thorough mixing 10 pounds of the xylene-containing stearic acid was added with rapid stirring. Coating on boxboard and drying were carried out as in Example I. The resulting surface was a bright, opaque white.

*Example X*

To the xylene-containing stearic acid of Example I was added about two pounds of Oil Red R dye and thoroughly mixed in before the xylene was added to the casein solution. The quantity of dye used may be varied from a fraction of a percent to about 5% of the xylene on a weight basis, and will depend upon the intensity of color desired. The final coating was similar to that of Example I except that it was red in color. Any oil soluble dye may be successfully substituted for the Oil Red R dye of this example.

Likewise, 5 pounds of azo rubine (red) dye was thoroughly mixed into the casein solution of Example I before emulsion formation. This also gave a red coating.

Figure 5:
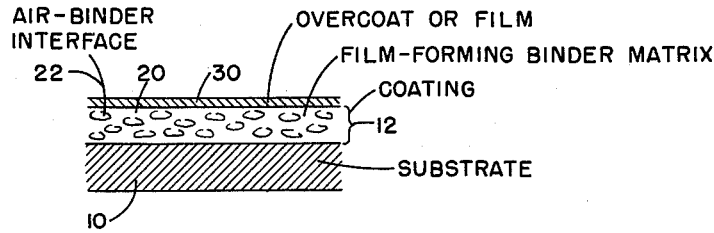
FIG. 5 is a modification of the coating of this invention showing the use of a transparent film over the coating.

Certain treatments may be applied to the surface of the coating of this invention to modify at least the surface characteristics. These may include the application of a thin overfilm of a suitable transparent material such a polystyrene as shown in FIG. 5 wherein the film is designated by the numeral 30. The coating may also be calendered by any of the known techniques to increase its gloss or it may be brushed to modify its ink receptivity.

Finally, the coating of this invention may be flame treated to modify its surface characteristics. By exposing the coating surface of this invention to a flame treatment it is possible to so modify the surface to make it more receptive to some types of printing inks and printing methods which otherwise may not be usable. Although it is not completely understood why flame treatment of this coating enhances its printability, examination of photomicrographs of untreated and treated films seems to indicate that the small interfaces on the surfaces are modified in some way as to permit ink to penetrate through a portion of the film thickness and thus to become sufficiently adhered to the film to give a good quality of printing. Examination of a cross-section of the film indicates that the ink deposited by printing on a flame-treated coating does not penetrate the entire thickness of the film, a fact which offers the advantage of printing with a smaller amount of ink than would be required if the ink penetrated the entire thickness, as it does with standard pigmented coatings.

The flame treating step may be defined as momentarily exposing the surface to an open flame or to any suitable source of heat to modify (e.g., enlarge) the air-matrix interfaces directly on the surface without causing any appreciable softening of the film or collapse of the air-matrix interface structure below the immediate surface. Flame treatment has been associated with plastic films which are continuous in nature, that is, films which are normally water- and air-impermeable and do not contain any interfaces such as are present in the basic film coating. In flame treating these plastic films it is believed that chemical changes are effected in the surface by free radical reaction. Although the technique of flame treating the coating of this invention (both with and without particulate additives) is essentially that used for flame treating polyethylene for example, the results of the flame treatment are unexpected and believed to be totally different because of the differences in film structure.

It is therefore possible to modify the surface of the coating of this invention to achieve a number of desired characteristics. In particular, the addition of a small amount of a particulate additive or the use of flame treatment enhances its printability. Since the quantities of the particulate additive required to achieve good printing characteristics are not large compared to the amount of film-forming matrix material, a substrate coated according to this invention may be bent, folded or scored without any chipping of the coating. This, of course, is also true of the flame treated coating.

In addition to its use as a conventional coating, i.e., as an ink or paint, the coating composition of this invention has a number of other uses to which paints and/or blush coatings are not applicable, or which make it possible to create new products.

Thus, the coating composition of this invention is particularly well suited to covering one or both sides of so-called boxboard or more specifically news-lined chipboard, thus eliminating the need of affixing white or colored liners (thin layers of paper) to the surfaces of dark colored body stocks. This application to boxboard places rigid performance requirements on such a coating; i.e., it should be essentially unaffected by water and moderate application of pressure; it should provide a surface which is easily printed, stamped, colored or otherwise marked; it should be capable of being bent, rolled, scored and handled without peeling, cracking or otherwise affected by these operations; and it should be of such a nature as to make possible the complete covering of a cheap, dark supporting material, such as commonly used waste news as in boxboard manufacture, with only one coating application while keeping the coating weight (and hence the overall weight of the final boxboard) to a minimum.

The availability of a suitable coating for boxboard means, first, the elimination of the usual liners, or thin covering sheets, which must be firmly adhered to one or both sides of the filler (as in patent coated newsboard). This in turn eliminates added cost of bleached fibers used in the manufacture of the liners, and the heavy clay coatings used in substitute products. Thus, the substitution of a nonpigmented coating for liners or clay coatings in boxboard has marked economic advantages as well as practical advantages such as better handling properties and lighter weight. Similar economic and practical advantages can be shown for other applications of the coating of this invention.

The ability to control the resistance or sensitivity of the final coating to pressure within the limits specified makes possible the use of the coating of this invention in forming several novel products. Of these may be listed, for example, a one-use, positive-printing duplicating paper, and printing plates suitable for such as intaglio and relief printing and for photographic copying processes.

In the case of what may be called a one-use, positive-printing duplicating paper, a flexible backing, conveniently of a dark color, may be coated with a white or lightly colored coating according to this invention. By proper adjustment in the binder/liquid ratio and/or moisture content, the final coating can be made sensitive to pressures such as are exerted by type face or by hand-held instruments such as a pencil. Control of pressure-sensitivity could conveniently make the coating insensitive to lesser pressures, such as thumb prints and typewriter platen pressures. The positive-printing duplicating paper may be used to replace the combination of a sheet of carbon paper and a sheet of paper to be marked upon, may be used in a typewriter or may be used as a drawing paper on which ink need not be employed. Color combinations of coating and background may be varied at will and the number of combinations are extensive.

The application of a fair amount of pressure to these coatings causes the coating to be compacted (probably collapsing most of the air-binder interfaces in the areas of pressure application) and the color, if dye is present, to become intensified. It is also possible that by the application of sufficient pressure to a coating so made as to be somewhat pressure sensitive the coating is actually pushed away or displaced in the areas of pressure application.

When the proper conditions are achieved, i.e., the application of sufficient pressure and the use of coating with the properly controlled pressure sensitivity, to form an indentation in the coating (which has been applied to a suitable material to make a printing plate), then the coating plate may be treated and used to hold ink either in the indentations or on the area surrounding the indentations. Likewise, the application of the coating of this invention to a transparent backing material would permit the making of a master plate (by application of pressure) which could be reproduced photographically by passing light through the printed area and the transparent backing. Once the mark or indentation has been made on the positive duplicating paper or the various types of printing plates made by the coating of this invention, the plate may be treated to render the coating insensitive to pressure. For example, it may be subjected to a surface treatment to render it more insensitive to moisture as described earlier, or overcoated with a thin transparent film.

It will be seen from the above description and examples that this invention is concerned with a new and unique type of coating. The fact that an opaque coating, which is insensitive to heat and water and which can be made controllably pressure-sensitive, and the fact that it can be made at the same time with or without particulate matter means that practical and economic advantages are attained.

The coating composition of this invention is particularly suited to coating boxboard (thus eliminating the cost and effort required to affix a costly bleached liner to the boxboard filler), to one-use duplicating paper and to printing plates. It must be emphasized, however, that the coating of this invention is applicable to surfaces other than those made of paper and as a coating composition it behaves as a true film-forming coating, not as a liquid which is absorbed by the paper to become an essential component of the fibrous structure. Although the coating composition may be used very successfully in place of paint, it is not a true paint for it contains no material in the role of a pigment but provides the desirable features of a conventional paint.

Neither must the coating composition of this invention be confused with an ordinary sizing composition, which is usually a casein solution applied to paper to prevent water or ink absorption due to capillarly attraction. Likewise, the coating of this invention is to be distinguished over a typical blush coating which is commonly deposited on tape or strips to receive tracing records made by a device which applies a minimum amount of pressure or which is heated, such as the commonly used stylus.

We claim:

1. Process of coating a substrate with an opaque, water-insoluble, relatively pressure-insensitive, substantially continuous film to form thereon a bright surface suitable for receiving printing, comprising the steps of
   (a) forming an oil-in-water emulsion, said emulsion consisting essentially of an aqueous dispersion of a film-forming binder material selected from the group consisting of casein, alpha protein, water-dispersible elastomers and mixtures thereof as the continuous phase, and a water-immiscible volatile liquid having a boiling point above that of water and being a non-solvent for said film-forming binder material as the discontinuous phase, the weight ratio of said film-forming binder material to said water-immiscible liquid ranging between 1:1 and 1:15;
   (b) applying a film of said emulsion to the surface of said substrate;
   (c) stabilizing the structure of the applied emulsion film by evaporating first a portion of the water of said emulsion and forming thereby a matrix of said film-forming binder material having distributed throughout minute globules of said water-immiscible liquid the dimensions of which remain substantially equivalent to those of the discontinuous phase in said applied emulsion film; and
   (d) then evaporating any remaining water from said matrix and evaporating said water-immiscible liquid from said globules to provide multitudinous air-binder interfaces, the sizes of which correspond substantially directly to the size of said globules and range in maximum dimension from about one-tenth to one micron with no appreciable number exceeding 5 microns, said interfaces being distributed throughout the volume of the film thus formed whereby the film is an opaque, bright, cavernulous, substantially continuous coating adhering to said substrate surface.

2. Process in accordance with claim 1 wherein said substrate is boxboard.

3. Process in accordance with claim 1 wherein said oil-in-water emulsion comprises xylene dispersed in an aqueous solution of casein ranging in concentration from 5 to 20% by weight casein.

4. Process of coating a substrate with a brilliant, white, opaque, water-insoluble, relatively pressure-insensitive, substantially continuous film to form thereon a surface devoid of pigment and suitable for receiving printing, comprising the steps of
   (a) forming an oil-in-water emulsion, said emulsion consisting essentially of an aqueous solution of a film-forming proteinaceous binder selected from the group consisting of casein and alpha protein as the continuous phase, and a water-immiscible volatile liquid having a boiling point above that of water and being a nonsolvent for said binder as the discontinuous phase, the weight ratio of said film-forming binder material to said water-immiscible liquid ranging between 1:1 and 1:15;
   (b) applying a film of said emulsion to the surface of said substrate;
   (c) converting said proteinaceous binder to a water-insoluble form;
   (d) stabilizing the structure of the applied emulsion film by evaporating first a portion of the water of said emulsion and forming thereby a matrix of said film-forming binder having distributed throughout minute globules of said water-immiscible liquid the dimensions of which remain substantially equivalent to those of the discontinuous phase in said applied emulsion film; and
   (e) then evaporating any remaining water from said matrix and evaporating said water-immiscible liquid from said globules to provide multitudinous air-binder interfaces, the sizes of which correspond substantially directly to the size of said globules and range in maximum dimension from about one-tenth to one micron with no appreciable number exceeding 5 microns, said interfaces being distributed throughout the volume of the film thus formed whereby the film is an opaque, bright, cavernulous, substantially continuous coating adhering to said substance surface.

5. Process of coating a substrate with an opaque, water-insoluble, relatively pressure-insensitive, substantially continuous film to form thereon a bright surface suitable for receiving printing, comprising the steps of
   (a) forming an oil-in-water emulsion, said emulsion consisting essentially of an aqueous dispersion of a film-forming binder material selected from the group consisting of casein, alpha protein, water-dispersible elastomers and mixtures thereof as the continuous phase, and a water-immiscible volatile liquid having a boiling point above that of water being a nonsolvent for said film-forming binder material as the discontinuous phase, the weight ratio of said film-forming binder material to said water-immiscible liquid ranging between 1:1 and 1:15;
   (b) applying a film of said emulsion to the surface of said substrate;
   (c) stabilizing the structure of the applied emulsion film by evaporating first a portion of the water of said emulsion and forming thereby a matrix of said film-forming binder material having distributed throughout minute globules of said water-immersible liquid the dimensions of which remain substantially equivalent to those of the discontinuous phase in said applied emulsion film;
   (d) then evaporating any remaining water from said matrix and evaporating said water-immiscible liquid from said globules to provide multitudinous air-binder interfaces, the sizes of which correspond substantially directly to the size of said globules and range in maximum dimension from about one-tenth to one micron with no appreciable number exceeding 5 microns, said interfaces being distributed throughout the volume of the film thus formed whereby the film is opaque, bright, cavernulous, substantially continuously coating adhering to said substrate surface; and (e) modifying the surface of said film thereby to modify its physical characteristics.

6. Process in accordance with claim 5 wherein said step of modifying said film comprises incorporating a particulate additive into said continuous phase of said oil-in-water emulsion.

7. Process in accordance with claim 5 wherein said step of modifying said film comprises flame treating the surface of said film.

8. Process in accordance with claim 5 wherein said step of modifying said film comprises calendering said film on said substrate.

9. Process in accordance with claim 5 wherein said step of modifying said film comprises brushing the surface of said film.

10. Process of coating the surface of a substrate with an opaque, water-insoluble, relatively pressure-insensitive, substantially continuous film to form thereon a bright surface suitable for receiving printing, comprising the steps of (a) forming an aqueous dispersion of a film-forming binder material selected from the group consisting of casein, alpha protein, water-dispersible elastomers and mixtures thereof;

(b) introducing into said aqueous dispersion a particulate additive in a quantity up to about eight times the weight of said film-forming binder material;

(c) forming an oil-in-water emulsion of said aqueous dispersion as the continuous phase and a water-immiscible volatile liquid having a boiling point above that of water and being a nonsolvent for said film-forming binder materials as the discontinuous phase, the weight ratio of said film-forming binder material to said water-immiscible liquid ranging between 1:1 and 1:15;

(d) applying a film of said emulsion to the surface of said substrate;

(e) stabilizing the structure of the applied emulsion film by evaporating first a portion of the water of said emulsion and forming thereby a matrix of said film-forming binder material having distributed throughout minute globules of said water-immiscible liquid the dimensions of which remain substantially equivalent to those of the discontinuous phase in said applied emulsion film; and (f) then evaporating any remaining water from said matrix and evaporating said water-immiscible liquid from said globules to provide multitudinous air-binder interfaces, the sizes of which correspond substantially directly to the size of said globules and range in maximum dimension from about one-tenth to one micron with no appreciable number exceeding 5 microns, said interfaces being distributed throughout the volume of the film thus formed whereby the film is an opaque, bright, cavernulous, substantially continuous coating adhering to said substrate surface and containing said particulate additive uniformly distributed throughout said matrix.

11. Process in accordance with claim 10 wherein said particulate additive is calcium carbonate.

12. Process in accordance with claim 10 wherein said particulate additive is clay.

13. Process in accordance with claim 10 wherein said substrate is boxboard.

14. Process of coating a substrate with an opaque, water-insoluble, relatively pressure-insensitive, substantially continuous film to form thereon a bright surface suitable for receiving printing, comprising the steps of (a) forming an oil-in-water emulsion, said emulsion consisting essentially of an aqueous dispersion of a film-forming binder material selected from the group consisting of casein, alpha protein, water-dispersible elastomers and mixtures thereof as the continuous phase, and a water-immiscible volatile liquid having a boiling point above that of water and being a nonsolvent for said film-forming binder material as the discontinuous phase, the weight ratio of said film-forming binder material to said water-immiscible liquid ranging between 1:1 and 1:15;

(b) applying a film of said emulsion to the surface of said substrate;

(c) stabilizing the structure of the applied emulsion film by evaporating first a portion of the water of said emulsion and forming thereby a matrix of said film-forming binder material having distributed throughout minute globules of said water-immiscible liquid the dimensions of which remain substantially equivalent to those of the discontinuous phase in said applied emulsion film;

(d) then evaporating any remaining water from said matrix and evaporating said water-immiscible liquid from said globules to provide multitudinous air-binder interfaces, the sizes of which correspond substantially directly to the size of said globules and range in maximum dimension from about one-tenth to one micron with no appreciable number exceeding 5 microns, said interfaces being distributed throughout the volume of the film thus formed whereby the film is an opaque, bright, cavernulous, substantially continuous coating adhering to said substrate surface; and (e) exposing the surface of said film to heat sufficient to enlarge said air-binder interfaces on said surface without fusing said film and destroying the structure of said film beneath said surface.

15. A substrate carrying permanently adhered thereto an opaque, substantially continuous, water-insoluble, relatively pressure-insensitive film essentially devoid of pigment and of occluded liquid and capable of receiving printing, said film being characterized as a dried uncollapsed residue of an emulsion wherein the continuous phase of said emulsion becomes said film which consists essentially of a film-forming binder material having distributed throughout its entire volume multitudinous air-binder interfaces, the sizes of which are substantially equivalent to the globules making up the discontinuous phase of the original emulsion and vary in maximum dimension from about one-tenth to one micron with no appreciable number exceeding five microns, thereby providing a uniformly cavernulous substantially continuous structure capable of scattering light to impart opaqueness to said film, said film-forming binder material being selected from the group consisting of casein, alpha protein, water-dispersible elastomers, and mixtures thereof.

16. A substrate carrying an opaque film in accordance with claim 15 wherein said substrate is boxboard.

17. A substrate carrying permanently adhered thereto an opaque, substantially continuous, water-insoluble, relatively pressure-insensitive film essentially devoid of pigment and of occluded liquid and capable of receiving printing, said film being characterized as a dried uncollapsed residue of an emulsion wherein the continuous phase of said emulsion becomes said film which consists essentially of a film-forming binder material having a particulate additive embedded therein and having distributed throughout its entire volume multitudinous air-binder interfaces, the sizes of which are substantially equivalent to the globules making up the discontinuous phase of the original emulsion and vary in maximum dimension from about one-tenth to one micron with no appreciable number exceeding five microns, thereby providing a uniformly cavernulous substantially continuous structure capable of scattering light to impart opaqueness to said film, said film-forming binder material being selected from the group consisting of casein, alpha protein, water-dispersible elastomers, and mixtures thereof.

18. Substrate in accordance with claim 17 wherein said particulate additive is clay.

19. Substrate in accordance with claim 17 wherein said particulate additive is chalk.

20. Substrate in accordance with claim 17 wherein said particulate additive is a metal powder.

References Cited in the file of this patent

UNITED STATES PATENTS

| | | |
|---|---|---|
| 2,208,236 | Wiener | July 16, 1940 |
| 2,310,795 | La Piana et al. | Feb. 9, 1943 |
| 2,339,707 | Kress et al. | Jan. 18, 1944 |
| 2,577,821 | Smith et al. | Dec. 11, 1951 |
| 2,739,909 | Rosenthal | Mar. 27, 1956 |
| 2,848,752 | Bechtold | Aug. 26, 1958 |
| 2,927,039 | Vander Weel | Mar. 1, 1960 |
| 2,961,334 | Clancy et al. | Nov. 22, 1960 |
| 3,015,581 | Gallino et al. | Jan. 2, 1962 |

OTHER REFERENCES

Casey, "Pulp and Paper," vol. 1, 1952, Interscience Publications, New York, pp. 556–562.